(12) United States Patent
Tashiro et al.

(10) Patent No.: US 11,345,404 B2
(45) Date of Patent: May 31, 2022

(54) FRONT VEHICLE-BODY STRUCTURE OF VEHICLE

(71) Applicant: MAZDA MOTOR CORPORATION, Hiroshima (JP)

(72) Inventors: Kuniyoshi Tashiro, Aki-gun (JP); Shigeaki Watanabe, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 97 days.

(21) Appl. No.: 17/067,251

(22) Filed: Oct. 9, 2020

(65) Prior Publication Data

US 2021/0114662 A1 Apr. 22, 2021

(30) Foreign Application Priority Data

Oct. 17, 2019 (JP) .............................. JP2019-190473

(51) Int. Cl.
*B62D 21/11* (2006.01)
*B62D 21/02* (2006.01)
*B62D 21/15* (2006.01)

(52) U.S. Cl.
CPC .............. *B62D 21/11* (2013.01); *B62D 21/02* (2013.01); *B62D 21/155* (2013.01)

(58) Field of Classification Search
CPC ........ B62D 21/00; B62D 21/02; B62D 21/11; B62D 21/152; B62D 21/155; B62D 25/08; B62D 25/082; B62D 25/088
See application file for complete search history.

(56) References Cited

U.S. PATENT DOCUMENTS

| | | | |
|---|---|---|---|
| 2018/0029643 A1* | 2/2018 | Maruyama | ........... B62D 25/088 |
| 2018/0072347 A1 | 3/2018 | Kamei et al. | |
| 2018/0273097 A1* | 9/2018 | Kurokawa | ............. B62D 21/11 |
| 2019/0061825 A1 | 2/2019 | Nakamura et al. | |
| 2019/0176898 A1* | 6/2019 | Nishii | .................. B62D 21/152 |

FOREIGN PATENT DOCUMENTS

| | | |
|---|---|---|
| EP | 2 070 805 A1 | 6/2009 |
| JP | 2009137523 A | 6/2009 |
| WO | WO-2017135032 A1 * 8/2017 | ........... B62D 21/152 |

OTHER PUBLICATIONS

The extended European search report issued by the European Patent Office dated Mar. 17, 2021, which corresponds to European Patent Application No. 20200924.7-1009 and is related to U.S. Appl. No. 17/067,251.

\* cited by examiner

*Primary Examiner* — Lori L Lyjak
(74) *Attorney, Agent, or Firm* — Studebaker & Brackett PC

(57) ABSTRACT

A front vehicle-body structure is characterized in that each of front side frames includes outer and inner members. The outer and inner members have vertical wall surface portions in which a recessed bead extending from a front side to at least a position next to a suspension tower portion in a vehicle front-rear direction is formed. A reinforcement extending in the vehicle front-rear direction and in an up-down direction that divides a closed cross-section of the front side frame into left and right is included between the members of the front side frame to which the suspension tower portion is connected. The reinforcement is formed to join to upper flange portions and lower flange portions of the members of the front side frame with the reinforcement being interposed between the upper flange portions and between the lower flange portions and to linearly extend in the up-down direction.

8 Claims, 15 Drawing Sheets

FRONT VEHICLE-BODY STRUCTURE OF VEHICLE

BACKGROUND

Technical Field

The present disclosure relates to a front vehicle-body structure of a vehicle including a pair of left and right front side frames extending in the vehicle front-rear direction.

Background Art

Hitherto, a configuration formed so as to absorb collision energy by compressively deforming front side frames in the vehicle front-rear direction at the time of a vehicle frontal collision has been known, and Japanese Patent Laid-Open No. 2009-137523 discloses a front vehicle-body structure of a vehicle as below.

At the time of a vehicle frontal collision, a front portion of the front side frame is compressively deformed (so-called axial compressive deformation) and crushed in the front-rear direction, and a rear portion of the front side frame is bent (so-called lateral breakage deformation) so as to protrude to the vehicle-width-direction outer side. In addition, recessed beads extending from the front portion toward the rear side are formed on vertical wall surface portions of an outer member and an inner member of the front portion of the front side frame, and the energy absorption amount at the time of the compressive deformation is increased by increasing ridges.

When the compressive deformation and the lateral breakage deformation are compared with each other, the axial compressive deformation can absorb a larger amount of collision energy with the same stroke, and hence a larger amount of energy absorption becomes possible if the compressive deformation is performed to a position on the side of a suspension tower.

However, when a recessed bead shape is formed to a position on the side of a suspension tower portion, the recessed bead shape serves as a room for elongation with respect to the load input from the suspension tower in the up-down direction. As a result, there is apprehension that the structure becomes weak against deformation with respect to the load in the up-down direction, and sectional collapse occurs in the front side frame by the load input from the suspension tower portion in the up-down direction, thereby deteriorating the NVH performance. In Japanese Patent Laid-Open No. 2009-137523, in order to prevent lateral breakage at an unnecessary position in the front side frame, in the front side frame that supports an engine mount next to the suspension tower, a reinforcement is disposed so as to extend in the front-rear direction so as to divide the closed cross-section of the front side frame to the left and the right. However, the region in which the reinforcement is disposed and positioned is a region in which energy is absorbed by the lateral breakage in the rear portion of the front side frame, a recessed bead extending in the front-rear direction is formed in a vertical surface of the reinforcement, and upper and lower joining positions of the reinforcement with respect to the front side frame are also in positions shifted from the position of the vertical surface in the vehicle width direction. Therefore, the reinforcement does not serve as a strengthening structure for suppressing the deformation with respect to the load from the suspension tower in the up-down direction.

SUMMARY

Accordingly, the present disclosure provides a front vehicle-body structure of a vehicle capable of suppressing sectional collapse of a front side frame due to a load input from a suspension tower portion in the up-down direction and suppressing the deterioration of the NVH performance.

A front vehicle-body structure of a vehicle according to the present disclosure is a front vehicle-body structure of a vehicle including a pair of left and right front side frames extending in a vehicle front-rear direction. In the front vehicle-body structure, each of the front side frames includes an outer member and an inner member, the outer member and the inner member each have a vertical wall surface portion in which a recessed bead or a protruding bead extending from a front side to at least a position next to a suspension tower portion in the vehicle front-rear direction is formed, a reinforcement disposed so as to extend in the vehicle front-rear direction and extend in an up-down direction so as to divide a closed cross-section of the front side frame into left and right is included between the inner member and the outer member of the front side frame to which the suspension tower portion is connected, and the reinforcement is formed to be joined to upper flange portions and lower flange portions of the outer member and the inner member of the front side frame with the reinforcement being interposed between the upper flange portions and between the lower flange portions and to linearly extend in the up-down direction.

According to the abovementioned configuration, the reinforcement extending in the up-down direction is provided in the closed cross-section of the front side frame to which the suspension tower portion is connected, and hence the sectional collapse of the front side frame due to the load input from the suspension tower portion in the up-down direction can be suppressed by the reinforcement and the deterioration of the NVH performance can be suppressed.

In particular, the reinforcement is interposed between the upper flange portions and between the lower flange portions and linearly extends in the up-down direction. Therefore, when a pulling force that pulls the front side frame upper portion to the upper side is applied from the suspension tower portion, the reinforcement reliably serves as a support against the displacement of the front side frame in the up-down direction, and hence the sectional collapse of the front side frame can be suppressed even more and the deterioration of the NVH performance can be suppressed.

In one embodiment of the present disclosure, the recessed bead is formed in each of the vertical wall surface portions of the outer member and the inner member of the front side frame, positions of the upper flange portions and the lower flange portions of the outer member and the inner member and the reinforcement in a vehicle width direction substantially match with a position of one of the recessed beads, the reinforcement is joined to a bottom surface of the one of the recessed beads, a folded portion folded toward another of the recessed beads is formed in the reinforcement; and the folded portion is joined to the another of the recessed beads. According to the abovementioned configuration, the reinforcement is joined to one of the recessed beads and the another of the recessed beads, and hence the sectional collapse of the front side frame can be prevented even more effectively and the deterioration of the NVH performance can be suppressed.

In one embodiment of the present disclosure, openings long in the up-down direction are formed in the reinforcement so as to be spaced apart from each other at a predetermined interval in the vehicle front-rear direction, and the openings each have a rim portion on which a step portion is formed. According to the abovementioned configuration, the fragile portion with respect to the load (frontal collision load) in the front-rear direction can be formed in the reinforcement by the openings that are long in the up-down direction, and the rigidity of the reinforcement against the compression direction and the pulling direction can be improved by forming the step portion. As a result, the sectional collapse of the front side frame due to the load input from the suspension tower portion in the up-down direction can be further effectively suppressed, and the deterioration of the NVH performance can be suppressed.

In one embodiment of the present disclosure, a subframe is mounted on a lower surface of the front side frame at a position directly behind the reinforcement, a joint member is provided in a front side frame cross-section at the position, and the joint member is joined to left and right ones of the recessed beads.

According to the abovementioned configuration, the deformation of the front side frame in the up-down direction due to the vertical load applied to the front side frame from the suspension tower portion can be suppressed even more effectively by both of the reinforcement and the joint member.

According to the present disclosure, effects in which the sectional collapse of the front side frame due to the load input from the suspension tower portion in the up-down direction can be suppressed and the deterioration of the NVH performance can be suppressed are obtained.

DETAILED DESCRIPTION

Accordingly, suppressing sectional collapse of a front side frame due to a load input from a suspension tower portion in the up-down direction and suppressing the deterioration of the NVH performance has been achieved by a configuration of a front vehicle-body structure of a vehicle, the front vehicle-body structure including a pair of left and right front side frames extending in a vehicle front-rear direction. In the front vehicle-body structure, each of the front side frames includes an outer member and an inner member, the outer member and the inner member each have a vertical wall surface portion in which a recessed bead or a protruding bead extending from a front side to at least a position next to a suspension tower portion in the vehicle front-rear direction is formed, a reinforcement disposed so as to extend in the vehicle front-rear direction and extend in an up-down direction so as to divide a closed cross-section of the front side frame into left and right is included between the inner member and the outer member of the front side frame to which the suspension tower portion is connected, and the reinforcement is formed to be joined to upper flange portions and lower flange portions of the outer member and the inner member of the front side frame with the reinforcement being interposed between the upper flange portions and between the lower flange portions and to linearly extend in the up-down direction.

Embodiment 1

Figure 1:
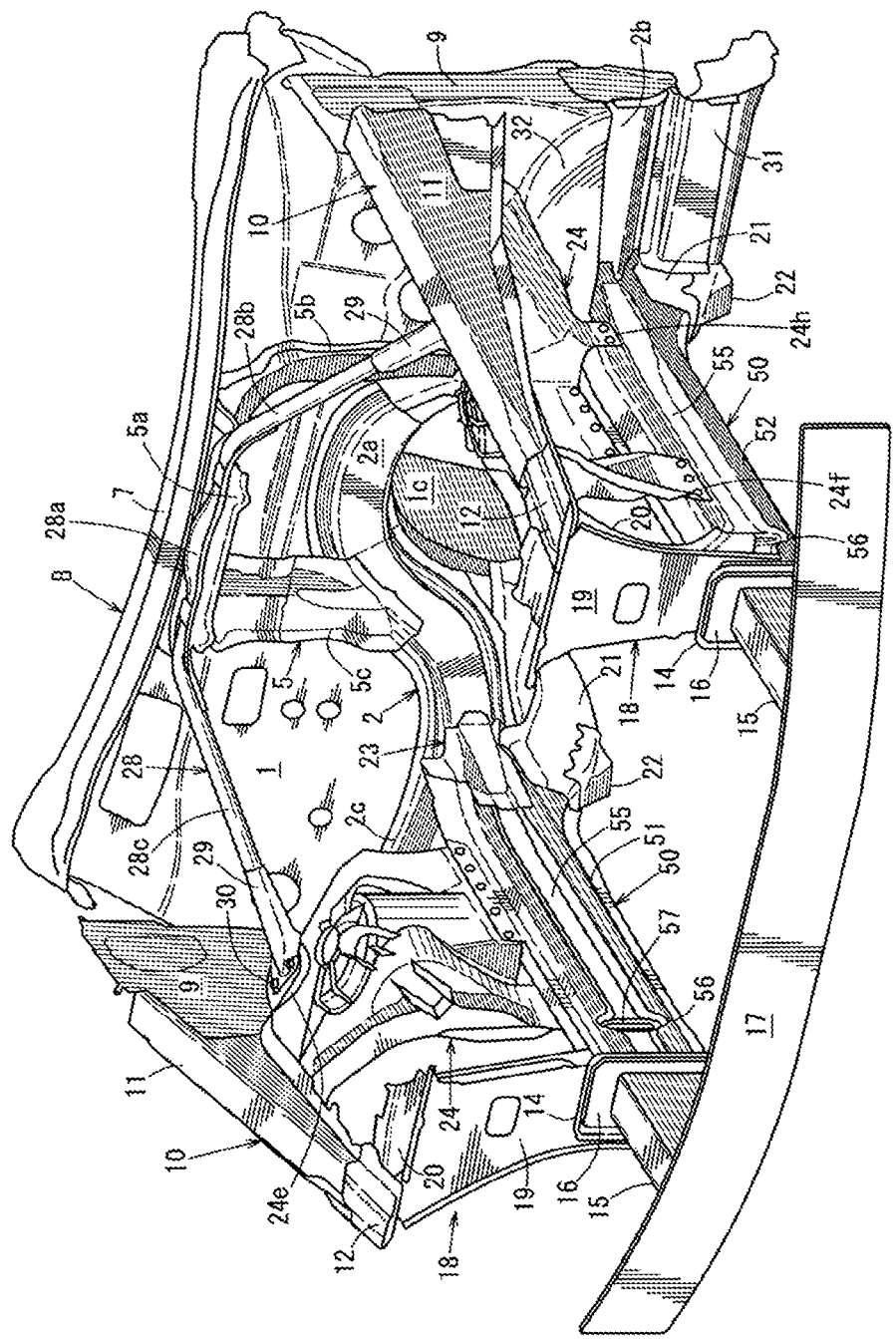
FIG. 1 is a perspective view illustrating a front vehicle-body structure of a vehicle of the present disclosure.
Figure 2:
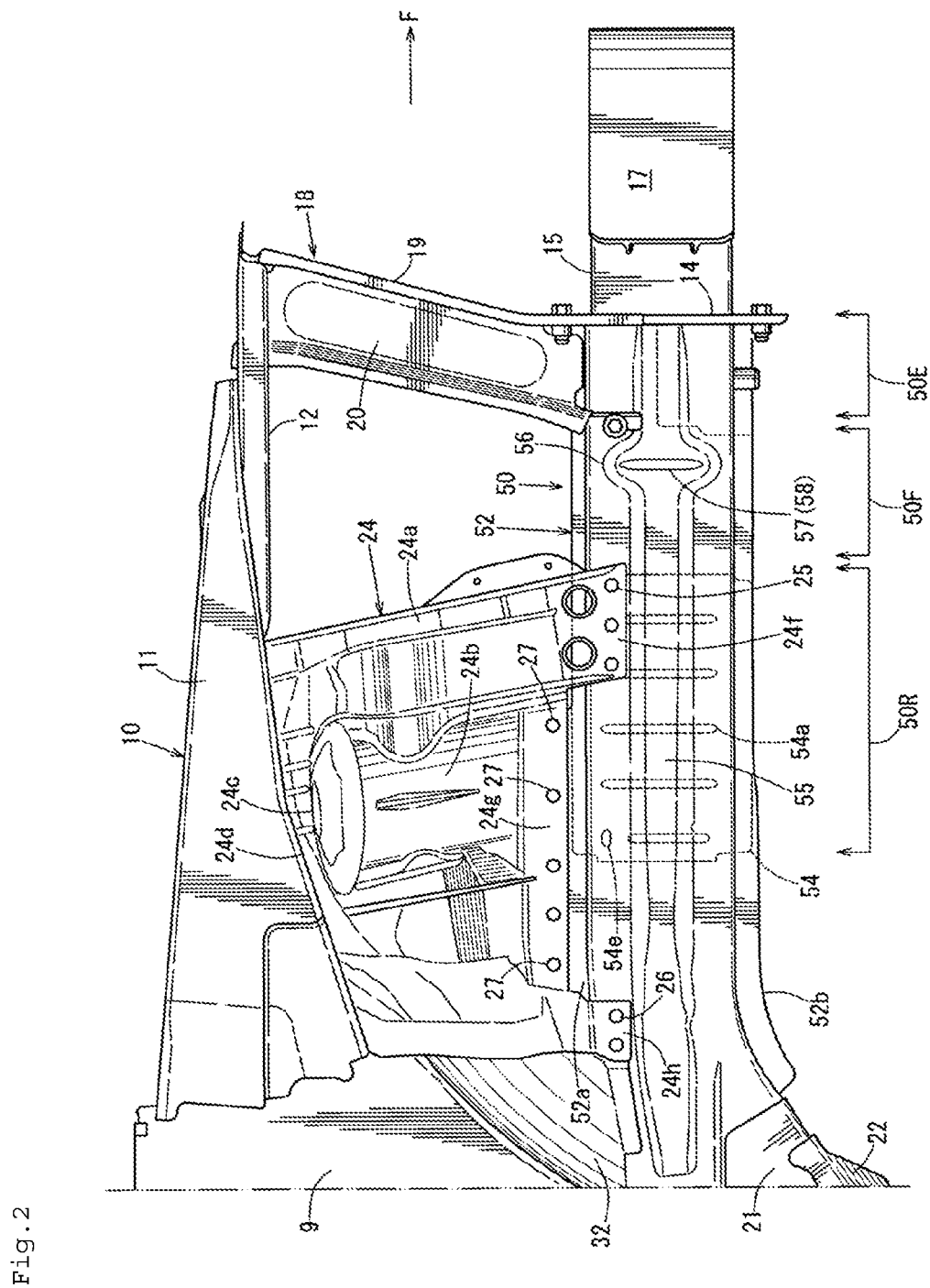
FIG. 2 is an outer side view illustrating the front vehicle-body structure on the vehicle right side.

One embodiment of the present disclosure is described in detail with reference to the drawings below. The drawings illustrate a front vehicle-body structure of a vehicle. FIG. 1 is a perspective view illustrating the front vehicle-body structure of the vehicle, FIG. 2 is an outer side view illustrating the front vehicle-body structure, and FIG. 3 is an inner side view of the front vehicle-body structure illustrated in a state in which a front-side-frame inner portion is removed.

Figure 3:
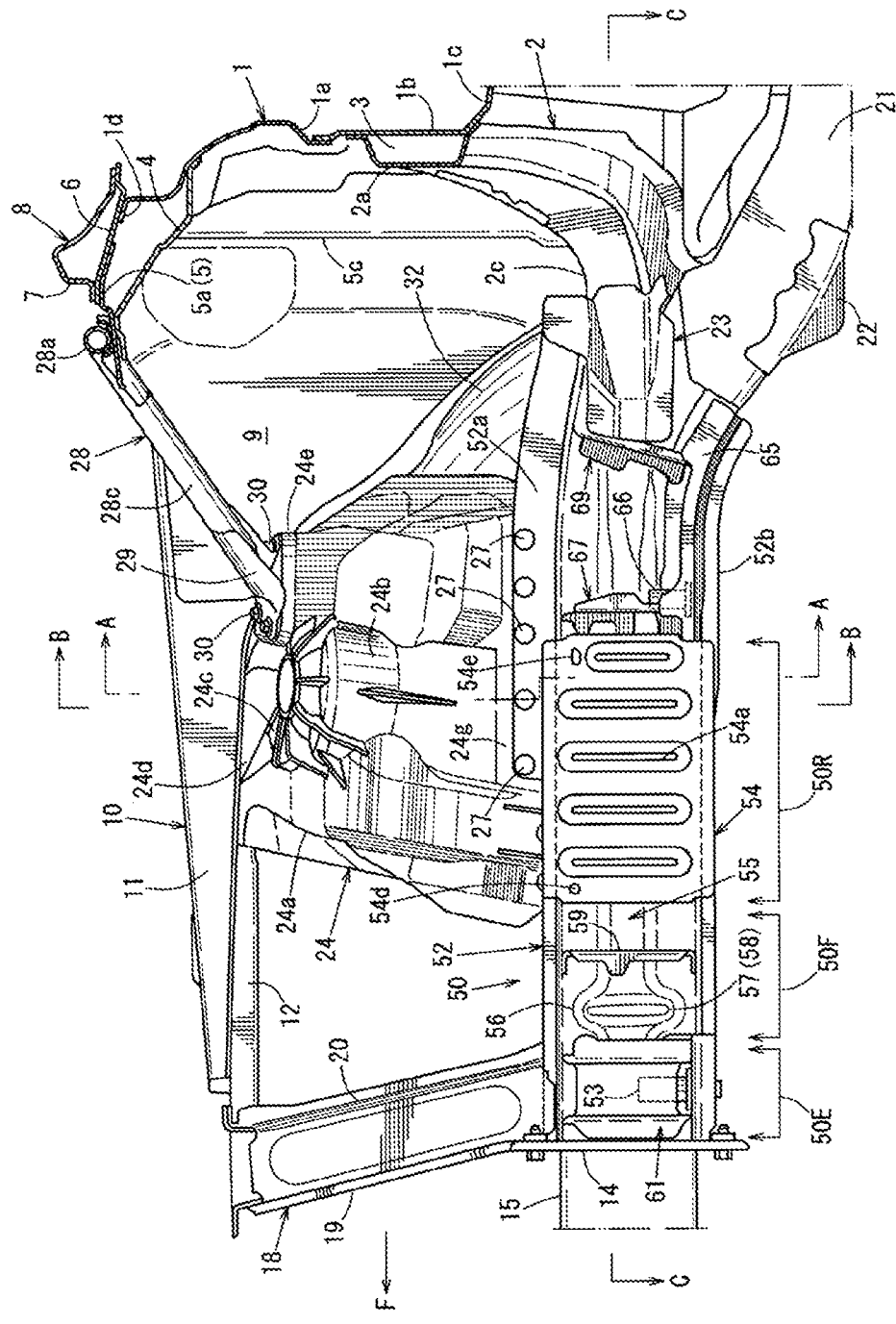
FIG. 3 is an inner side view of the front vehicle-body structure illustrated in state in which a front-side-frame inner portion is removed.
Figure 4:
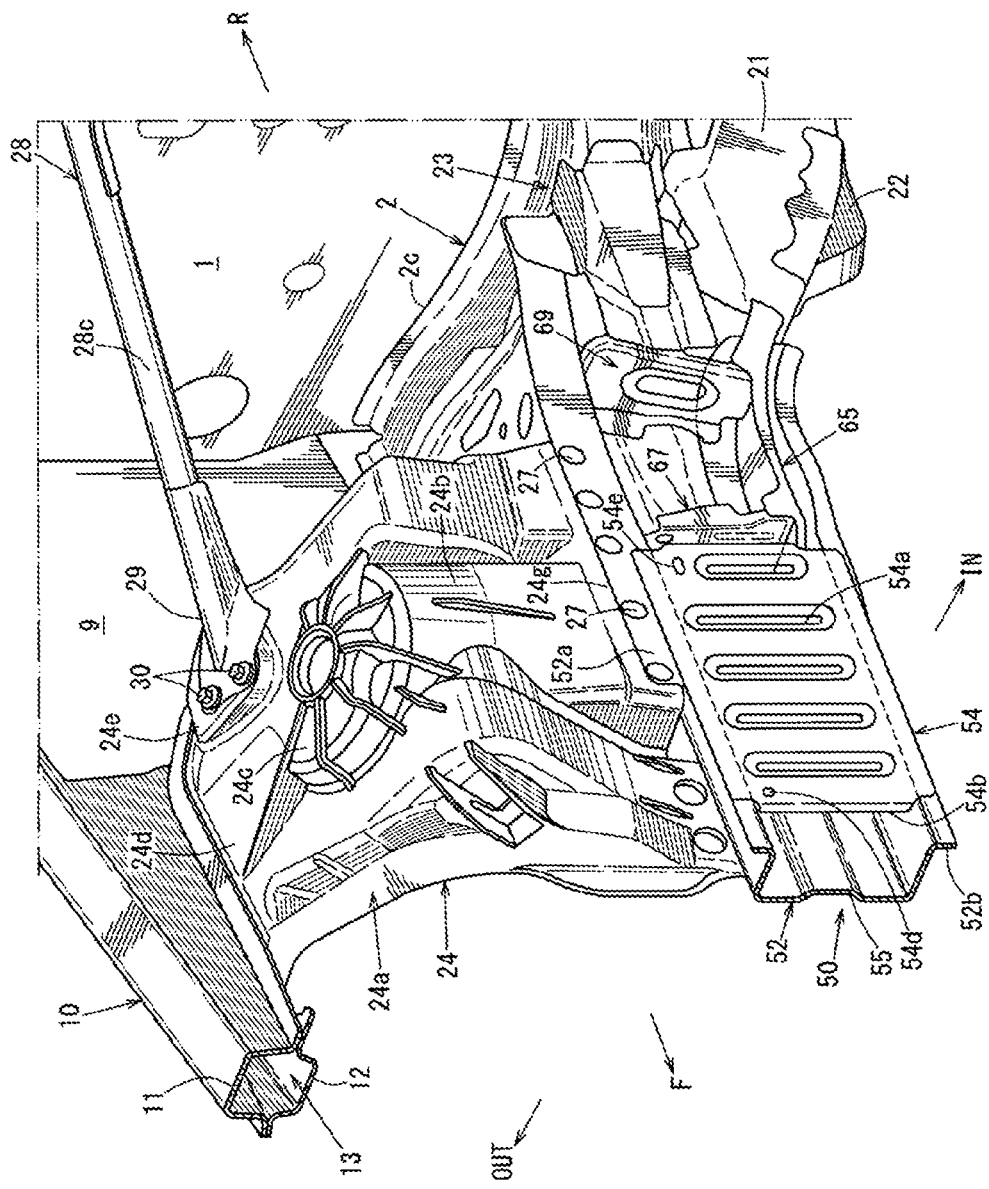
FIG. 4 is a main-part perspective view of FIG. 3.
Figure 5B:
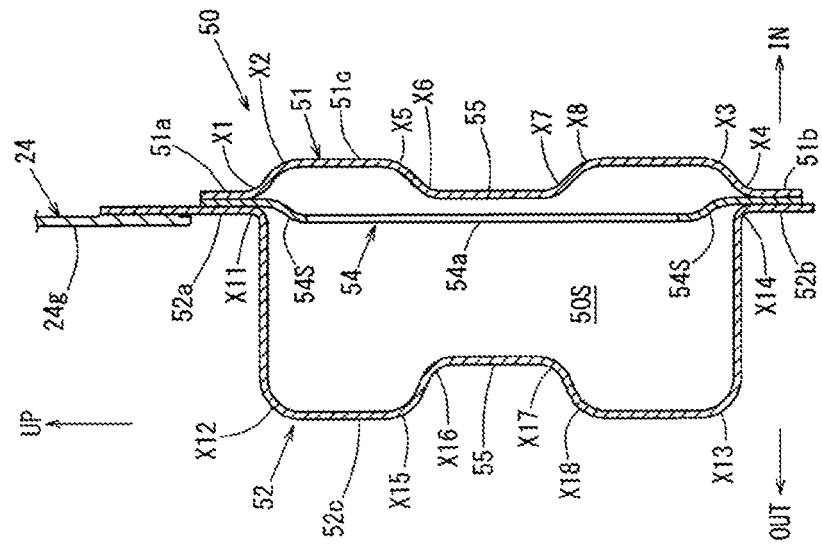
FIG. 5B is a main-part enlarged cross-sectional view taken along line B-B in FIG. 3.
Figure 5A:
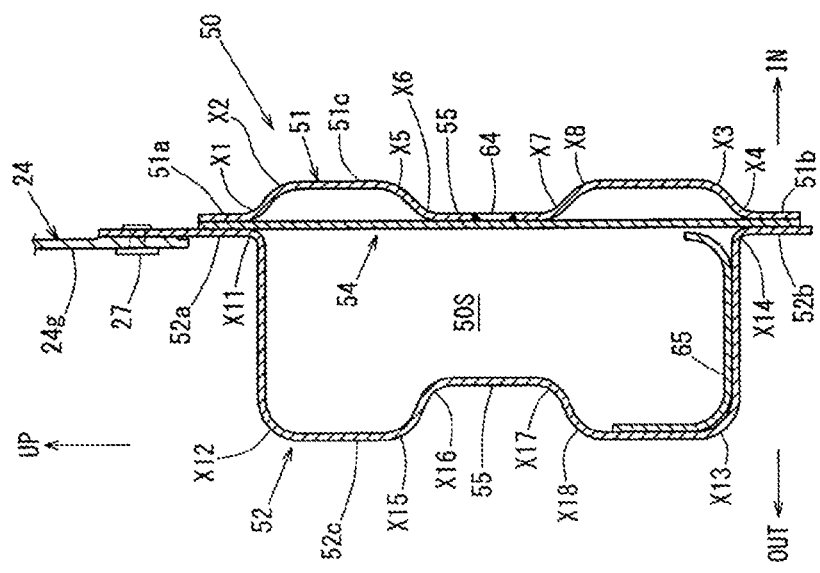
FIG. 5A is a main-part enlarged cross-sectional view taken along line A-A in FIG. 3.
Figure 6:
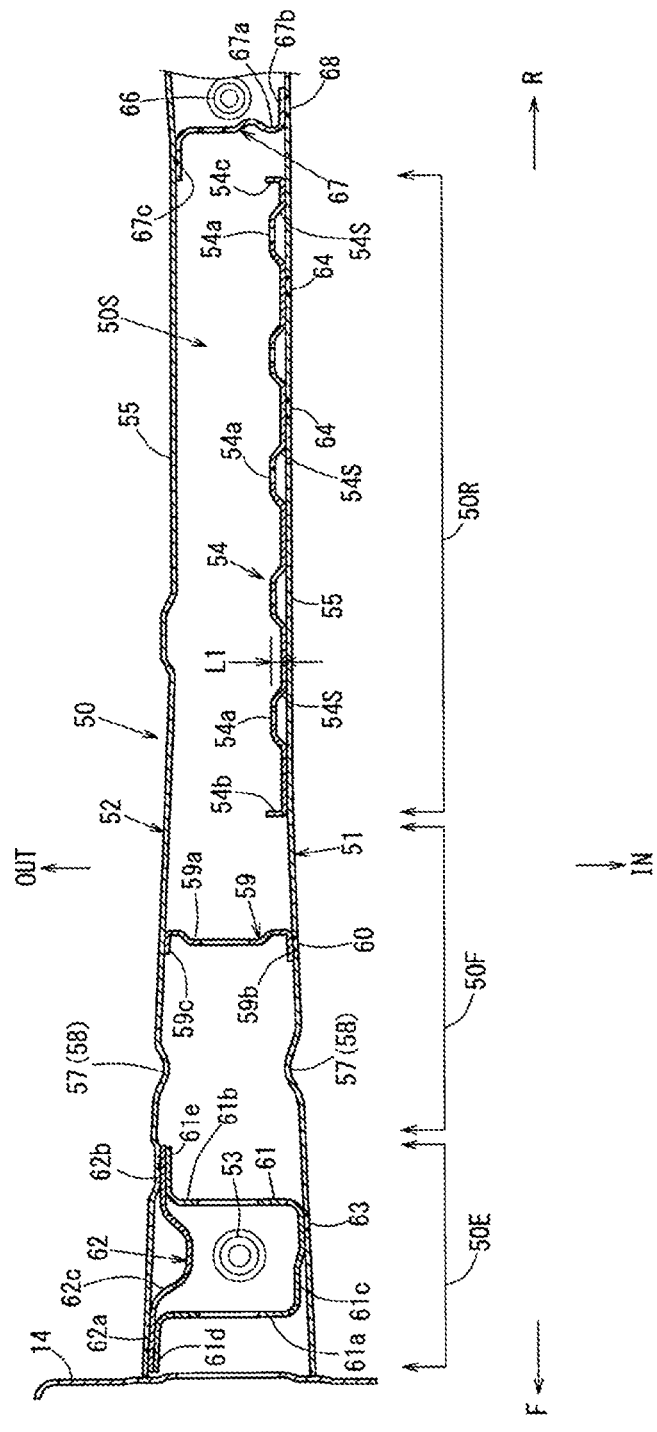
FIG. 6 is a main-part enlarged cross-sectional view taken along line C-C in
FIG. 3.
Figure 7:
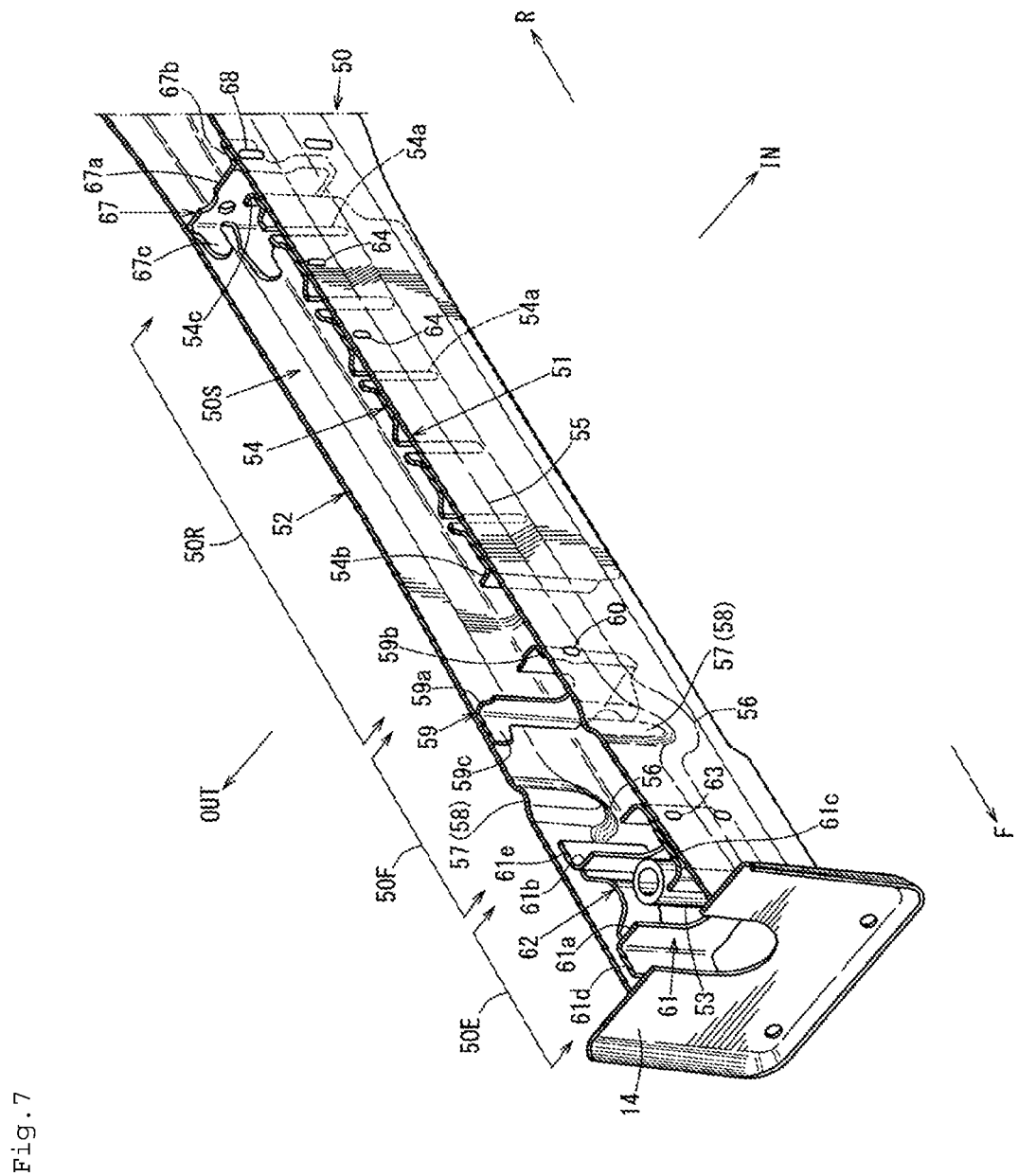
FIG. 7 is an upper perspective view of FIG. 6.

FIG. 4 is a main-part perspective view of FIG. 3, FIG. 5A is a main-part enlarged cross-sectional view taken along line A-A in FIG. 3, FIG. 5B is a main-part enlarged cross-sectional view taken along line B-B in FIG. 3, FIG. 6 is a main-part enlarged cross-sectional view taken along line C-C in FIG. 3, and FIG. 7 is an upper perspective view of FIG. 6.

Figure 8:
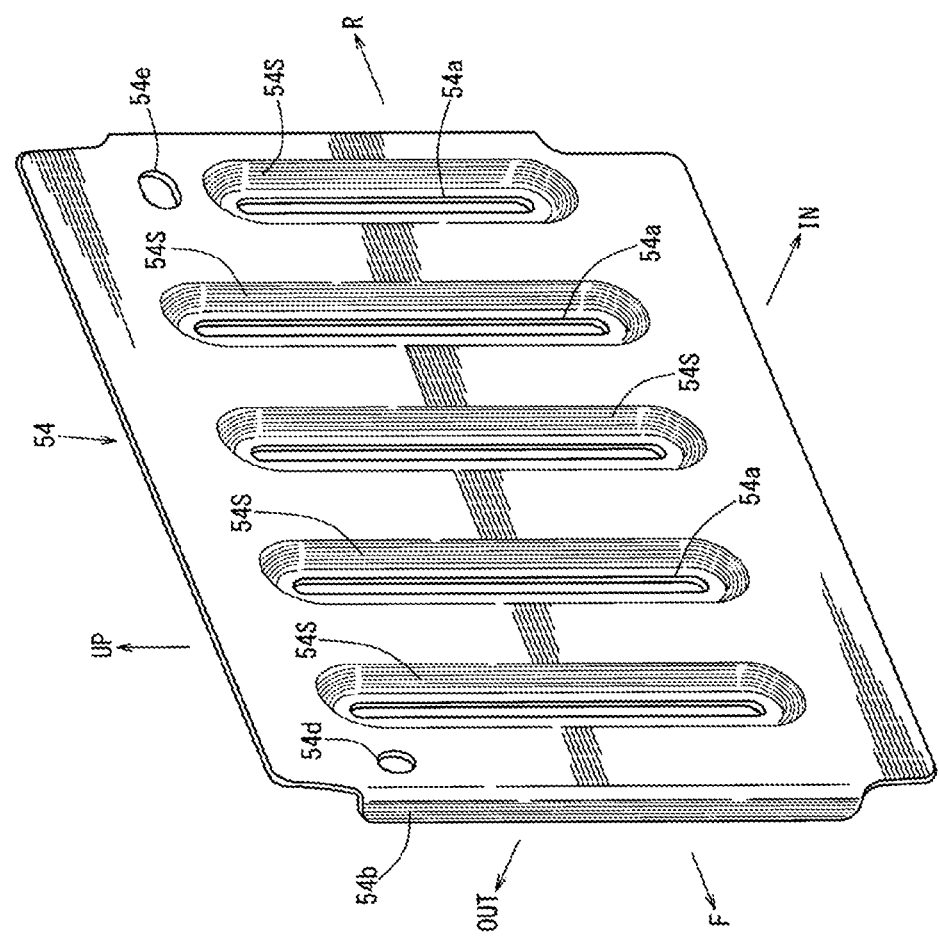
FIG. 8 is a perspective view illustrating a reinforcement.
Figure 9:
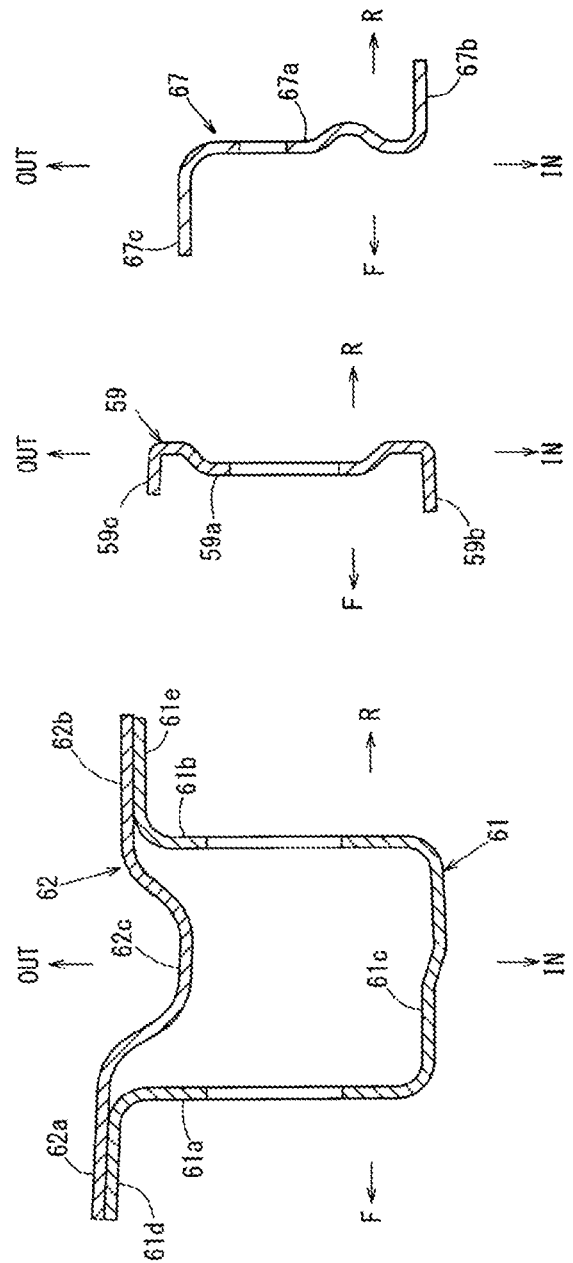
FIG. 9A is an enlarged plan view of a reinforcement member on a subframe front side mounting portion.
FIG. 9B is an enlarged plan view of a front portion joint member.
FIG. 9C is an enlarged plan view of an intermediate joint member.

FIG. 8 is a perspective view illustrating a reinforcement, FIG. 9A is a plan view of a reinforcement member positioned on a subframe front side mounting portion, FIG. 9B is a plan view of a front portion joint member, and FIG. 9C is a plan view of an intermediate joint member.

FIG. 2 to FIG. 9C illustrate a structure on the vehicle right side, and hence the structure on the vehicle right side is mainly described in the description below, but the structure on the vehicle left side is formed to be bilaterally symmetrical or substantially bilaterally symmetrical to the structure on the right side.

In FIG. 3, a dash lower panel 1 that separates an engine room (however, a motor room in the case of an electric vehicle) and a vehicle cabin from each other in the vehicle front-rear direction is provided. In this embodiment, the dash lower panel 1 is divided into upper and lower two parts, that is, an upper panel 1*a* and a lower panel 1*b*. A tunnel portion 1c is formed in the center of a lower portion of the lower panel 1b in the vehicle width direction.

As illustrated in FIG. 1 and FIG. 3, on a front portion of the dash lower panel 1, a dash cross member 2 having a cross-sectional hat-shaped profile along the tunnel portion 1c and a lower portion of the dash lower panel 1 is provided, and a dash cross closed cross-section 3 (see FIG. 3) is formed between the dash cross member 2 and the dash lower panel 1. As illustrated in FIG. 1, the dash cross member 2 includes an arch portion 2a that is a section corresponding to the tunnel portion 1c, and horizontal portions 2b and 2c extending to the vehicle-width-direction left and right outer sides from a lower portion of the arch portion 2a.

As illustrated in FIG. 3, on an upper portion of the dash lower panel 1, a cowl portion 8 formed by a dash reinforcement 4, a bridge portion 5a of a dash panel reinforcement member 5, a dash upper panel 6, and a cowl panel 7 is formed. The dash reinforcement 4 is a member extending to the vehicle front side from the upper portion of the dash lower panel 1. The bridge portion 5a of the dash panel reinforcement member 5 is a member extending in the vehicle front-rear direction with respect to a front portion of the dash reinforcement 4. The dash upper panel 6 is joined to a rear portion of the bridge portion 5a and an upper end bending portion 1d of the dash lower panel 1. The cowl panel 7 is joined to an upper portion of the dash upper panel 6.

As illustrated in FIG. 1, the dash panel reinforcement member 5 is formed by left and right leg portions 5b and 5c extending to the upper side from the dash cross member 2 corresponding to the left and right of a front portion of the tunnel portion 1c, and the bridge portion 5a that connects upper end portions of the leg portions 5b and 5c to each other in the vehicle width direction. A closed cross-section (not shown) extending in the up-down direction is formed between the left and right leg portions 5b and 5c and the dash lower panel 1.

Hinge pillars (not shown) that are vehicle body strengthening members are mounted on both of vehicle-width-direction left and right ends of the cowl portion 8 and the dash lower panel 1, and apron reinforcements 10 are provided on front portions of the hinge pillars via apron panels 9 as illustrated in FIG. 1 to FIG. 4.

The apron reinforcement 10 is a vehicle body strengthening member extending in the vehicle front-rear direction, and the apron reinforcement 10 is formed by joining an apron reinforcement upper portion 11 having a cross-sectional hat-shaped profile and an apron reinforcement lower portion 12 having a cross-sectional inverted-hat-shaped profile to each other as illustrated in FIG. 4. An apron reinforcement closed cross-section 13 extending in the front-rear direction of the vehicle is formed between the apron reinforcement upper portion 11 and the apron reinforcement lower portion 12.

As illustrated in FIG. 1, on the vehicle-width-direction inner sides and lower sides with respect to the apron reinforcements 10, a pair of left and right front side frames 50 and 50 extending to the front side of the vehicle from the dash lower panel 1 including the dash cross member 2 are provided. The front side frames 50 are vehicle body strengthening members extending in the front-rear direction of the vehicle on both of left and right sides of the engine room (however, a motor room in the case of an electric vehicle).

As illustrated in FIG. 1, set plates 14 are mounted on front ends of the front side frames 50, and mounting plates 16 on rear end portions of crash cans 15 are fastened and fixed to the set plates 14. A bumper beam 17 extending in the vehicle width direction is mounted on the front portions of the pair of left and right front side frames 50 and 50 via the set plates 14, the mounting plates 16, and the crash cans 15.

As illustrated in FIG. 1 to FIG. 3, a front portion of the front side frame 50 and a front portion of the apron reinforcement lower portion 12 are connected to each other by a shroud side 18 extending in the up-down direction. As illustrated in the same drawings, the shroud side 18 includes a shroud side front side member 19 and a shroud side rear side member 20. Upper end portions of the left and right shroud sides 18 and 18 are connected to each other by a shroud upper portion (not shown) in the vehicle width direction.

As illustrated in FIG. 1 to FIG. 4, on a rear end portion of the front side frame 50, a floor frame 21 extending to the vehicle rear side from the rear end portion of the front side frame 50 along a lower surface of the floor panel is provided. The floor frame 21 is a vehicle body strengthening member extending in the vehicle front-rear direction so as to be continuous with the front side frame 50, and a floor frame closed cross-section (not shown) extending in the front-rear direction of the vehicle is formed between the floor panel and the floor frame 21. On a subframe rear side mounting position in the floor frame 21, a subframe mounting seat 22 is mounted.

As illustrated in FIG. 5A and FIG. 5B, the front side frame 50 is formed by joining upper and lower joining flange portions 51a, 52a, 51b, and 52b of a front-side-frame inner portion 51 serving as an inner member and a front-side-frame outer portion 52 serving as an outer member. As illustrated in FIG. 1, a gusset member 23 is diagonally mounted between a rear portion of the front-side-frame inner portion 51 and the horizontal portion 2c of the dash cross member 2 positioned on the rear side thereof.

As illustrated in FIG. 1 to FIG. 4, a front suspension tower portion 24 (hereinafter simply abbreviated to a suspension tower portion 24) made by aluminum casting is mounted between the apron reinforcement 10 and the front side frame 50.

As illustrated in FIG. 2 to FIG. 4, in the suspension tower portion 24, a tower portion 24b, a suspension top portion 24c, an upper wall portion 24d, a tower bar mounting seat 24e protruding to the upper side from a rear portion of the upper wall portion 24d, a front lower mounting portion 24f, an intermediate lower side mounting portion 24g, and a rear lower mounting portion 24h are integrally formed on a suspension housing 24a.

On the upper wall portion 24d of the suspension tower portion 24, the apron reinforcement upper portion 11 is mounted with use of rivets (not shown). As illustrated in FIG. 2, the front lower mounting portion 24f is mounted on the front-side-frame outer portion 52 with use of a plurality of rivets 25. Similarly, as illustrated in FIG. 2, the rear lower mounting portion 24h is mounted on the front-side-frame outer portion 52 with use of a plurality of rivets 26. As illustrated in FIG. 2 to FIG. 4 and FIG. 5A, the intermediate lower side mounting portion 24g is mounted on the joining flange portion 52a (in detail, an upper side extending portion thereof) on the upper side of the front-side-frame outer portion 52 with use of a plurality of rivets 27. As the rivets 25, 26, and 27, self-piercing rivets (so-called SPRs) can be used.

As illustrated in FIG. 1, a substantially V-shaped tower bar 28 of which vehicle front side is opened in a plan view is provided. The tower bar 28 includes a base portion 28a, left and right slant portions 28b and 28c, and brackets 29 and 29 fixed to front end portions of the slant portions 28b and 28c. As illustrated in FIG. 1 and FIG. 3, the base portion 28a of the tower bar 28 is fixed to the bridge portion 5a of the dash panel reinforcement member 5, and the brackets 29 are fixed to the tower bar mounting seats 24e of the suspension tower portions 24 with use of a plurality of fastening members 30.

By the tower bar 28, the displacement of the suspension tower portion 24 is suppressed and the steering stability and the ride quality are improved. In FIG. 1, reference numeral 31 denotes a torque box. In FIG. 1 to FIG. 3, reference numeral 32 denotes a wheel well.

As illustrated in FIG. 2, FIG. 3, and FIG. 6, the front side frame 50 includes a front end 50E, a front side portion 50F, and a rear side portion 50R. The front end 50E of the front side frame 50 is a region in which a weld nut 53 serving as a subframe mounting portion on which a front side of the subframe is mounted is provided. The rear side portion 50R of the front side frame 50 is a region in which a reinforcement 54 described below is joined at a position corresponding to at least the tower portion 24b of the suspension tower portion 24. The front side portion 50F of the front side frame 50 is a region positioned between the front end 50E and the rear side portion 50R.

In the front side frame 50, the rear side portion 50R is formed to have a higher rigidity than the front side portion 50F. Specifically, the reinforcement 54 extending in the vehicle front-rear direction and joined to the rear side portion 50R is included in the rear side portion 50R of the front side frame 50, while no reinforcement is provided in the front side portion 50F. As a result, the rear side portion 50R is formed to have a higher rigidity than the front side portion 50F. In each of the regions of the front side portion 50F and the rear side portion 50R, rigidity differences are alternately formed in the vehicle front-rear direction.

Specifically, in the front side portion 50F of the front side frame 50, as illustrated in FIG. 6 and FIG. 7, a low rigidity portion 58 of which rigidity is the lowest is formed by a recessed up-down bead portion 57, and a front portion joint member 59 is disposed in the front side frame 50 at a place directly behind the recessed up-down bead portion 57. As a result, in the front side portion 50F, the rigidity differences are alternately formed in the vehicle front-rear direction. Details of the elements 57, 58, and 59 are described below.

In the rear side portion 50R of the front side frame 50, as illustrated in FIG. 6 and FIG. 7, the rigidity differences are alternately formed in the vehicle front-rear direction in the rear side portion 50R by forming a plurality of oval openings 54a serving as fragile portions in the reinforcement 54 so as to be spaced apart from each other at a predetermined interval in the vehicle front-rear direction.

Specifically, by forming the plurality of openings 54a in the reinforcement 54, sections having the openings 54a and having a relatively low rigidity and sections without the openings 54a and having a relatively high rigidity are alternately formed in the vehicle front-rear direction.

In other words, in the front side frame 50, the rear side portion 50R is formed to have a higher rigidity than the front side portion 50F and the rigidity differences are alternately formed in the vehicle front-rear direction in each of the regions of the front side portion 50F and the rear side portion 50R.

As a result, compressive deformation starts from the front side portion 50F of the front side frame 50 of which rigidity is relatively low at the time of a vehicle frontal collision. Then, the rear side portion 50R of the front side frame 50 of which rigidity is relatively high is compressively deformed, to thereby compressively deform the front side frame 50 in a smooth bellows form from the front side portion 50F across the entire longitudinal direction.

As already described above, the reinforcement 54 extending in the vehicle front-rear direction and joined to the front side frame 50 is included, and the openings 54a serving as a plurality of fragile portions are formed in the reinforcement 54 so as to be spaced apart from each other at a predetermined interval in the vehicle front-rear direction.

As a result, the collision energy absorption amount at the time of a vehicle frontal collision is improved by the reinforcement 54, and the front side frame 50 is compressively deformed to a smooth bellows form by the openings 54a serving as the plurality of fragile portions spaced apart from each other at a predetermined interval in the front-rear direction.

The fragile portions are formed from the oval openings 54a extending in the up-down direction. As a result, a large rigidity difference is generated in the reinforcement 54 in the vehicle front-rear direction by a simple configuration, compressive deformation of the front side frame 50 in a smooth bellows form is achieved at the time of a vehicle frontal collision, and the weight of the reinforcement 54 is also saved.

As illustrated in FIG. 5A and FIG. 5B, the front side frame 50 includes an outer wall surface portion 52c (a vertical wall surface portion of the front-side-frame outer portion 52) and an inner wall surface portion 51c (a vertical wall surface portion of the front-side-frame inner portion 51).

As illustrated in FIG. 5A and FIG. 5B, the front-side-frame inner portion 51 is formed to have a cross-sectional sideways-hat-shaped profile opened to the vehicle-width-direction outer side by the upper and lower joining flange portions 51a and 51b and the inner wall surface portion 51c. Similarly, the front-side-frame outer portion 52 is formed in a cross-sectional sideways-hat-shaped profile opened to the vehicle-width-direction inner side by the upper and lower joining flange portions 52a and 52b and the outer wall surface portion 52c. As illustrated in the same drawings, recessed front-rear bead portions 55 serving as recessed beads extending in the front-rear direction of the vehicle are formed in up-down-direction central sections of the outer wall surface portion 52c and the inner wall surface portion 51c of the front side frame 50.

By the recessed front-rear bead portion 55 (recessed bead) formed in the front-side-frame inner portion 51, ridges X5 to X8 due to the recessed front-rear bead portion 55 are formed in an increased manner with respect to original ridges X1 to X4 in the front-side-frame inner portion 51.

Similarly, by the recessed front-rear bead portion 55 (recessed bead) formed in the front-side-frame outer portion 52, ridges X15 to X18 due to the recessed front-rear bead portion 55 are formed in an increased manner with respect to original ridges X11 to X14 in the front-side-frame outer portion 52. Each of the recessed front-rear bead portions 55 extends from the front side of the front side frame 50 to at least a position next to the suspension tower portion 24 in the vehicle front-rear direction.

As illustrated in FIG. 1 to FIG. 3, at a position in the front side portion 50F of the front side frame 50 close to the front side, an up-down-width enlarged portion 56 at which the up-down width of the recessed front-rear bead portion 55 is enlarged in the up-down direction is formed. The up-down-width enlarged portion 56 is formed in each of positions in the front-side-frame inner portion 51 and the front-side-frame outer portion 52 facing each other in the vehicle width direction.

As illustrated in FIG. 2, FIG. 3, FIG. 6, and FIG. 7, the recessed up-down bead portion 57 extending in the up-down direction and recessed to the inner side of the front side frame 50 as compared to the recessed front-rear bead portion 55 is formed in the up-down-width enlarged portion 56 within the range of the up-down width thereof. The low rigidity portion 58 is formed by the recessed up-down bead portion 57.

By forming the low rigidity portion 58, when the front side frame 50 is compressively deformed from the front side portion 50F at the time of a vehicle frontal collision, the low rigidity portion 58 formed in a position in the front side portion 50F close to the front side serves as a breaking starting point. As a result, deformation from the middle of the front side portion 50F of the front side frame 50 in the front-rear direction is suppressed, and deformation from a position in the front side portion 50F of the front side frame 50 close to the front side becomes possible.

The front portion joint member 59 illustrated in FIG. 6 is positioned in the front side frame 50 at a place directly behind the recessed up-down bead portion 57 or the up-down-width enlarged portion 56, and a rigidity difference is formed by the front portion joint member 59 and the recessed up-down bead portion 57 (or the up-down-width enlarged portion 56). As a result, the start of the compressive deformation is reliably induced, and the compressive deformation of the front side frame 50 in a bellows form becomes possible.

As illustrated in FIG. 9B, the front portion joint member 59 includes a joint 59a extending in the vehicle width direction, and flanges 59b and 59c formed so as to be integrally bent toward the vehicle front side from both of vehicle-width-direction ends of the joint 59a. As illustrated in FIG. 6, the flange 59b on the vehicle-width-direction inner side is fixed to the inner surface of the front-side-frame inner portion 51 with use of an opening 60 for arc welding formed in the front-side-frame inner portion 51. The flange 59c on the vehicle-width-direction outer side is fixed to the inner surface of the front-side-frame outer portion 52 by spot welding means.

As illustrated in FIG. 3, FIG. 6, and FIG. 7, in the front end 50E of the front side frame 50 positioned on the vehicle front side of the front side portion 50F of the front side frame 50, the weld nut 53 is provided as the subframe mounting portion. The recessed up-down bead portion 57 or the up-down-width enlarged portion 56 is provided directly behind the weld nut 53.

By providing the weld nut 53 serving as the subframe mounting portion in the front end 50E of the front side frame 50 positioned on the vehicle front side of the front side portion 50F and providing the recessed up-down bead portion 57 and the up-down-width enlarged portion 56 directly behind the weld nut 53, the subframe front portion can be supported while suppressing influence on the compressive deformation.

As illustrated in FIG. 6 and FIG. 7, the periphery of the weld nut 53 is strengthened by an inner-side reinforcement member 61 and an outer-side reinforcement member 62 disposed in the front side frame 50. As illustrated in FIG. 9A, the inner-side reinforcement member 61 is obtained by integrally forming a front wall 61a and a rear wall 61b extending in the vehicle width direction, an inner wall 61c connecting vehicle-width-direction inner ends of those walls 61a and 61b to each other in the front-rear direction, and flanges 61d and 61e extending to the front side and the rear side from vehicle-width-direction outer ends of the front wall 61a and the rear wall 61b. The outer-side reinforcement member 62 is obtained by integrally connecting front and rear flanges 62a and 62b to each other by a connecting wall 62c in the front-rear direction.

As illustrated in FIG. 6 and FIG. 7, the inner wall 61c of the inner-side reinforcement member 61 is fixed to the inner surface of the front-side-frame inner portion 51 with use of an opening 63 for arc welding formed in the front-side-frame inner portion 51.

The flanges 61d and 62a on the front side of the inner-side reinforcement member 61 and the outer-side reinforcement member 62 are three-piece-joined and fixed to the front-side-frame outer portion 52 by spot welding means. Similarly, flanges 61e and 62b on the rear side of the inner-side reinforcement member 61 and the outer-side reinforcement member 62 are also three-piece-joined and fixed to the front-side-frame outer portion 52 by spot welding means. By the reinforcement members 61 and 62, the supporting rigidity of the subframe front portion is improved.

As illustrated in FIG. 5, the reinforcement 54 has an upper end portion that is joined and fixed to the joining flange portion 51a on the upper side of the front-side-frame inner portion 51 and the joining flange portion 52a on the upper side of the front-side-frame outer portion 52 to which the suspension tower portion 24 is connected with the reinforcement 54 being interposed between the joining flange portion 51a and the joining flange portion 52a. Similarly, a lower end portion of the reinforcement 54 is joined and fixed to the joining flange portion 51b on the lower side of the front-side-frame inner portion 51 and the joining flange portion 52b on the lower side of the front-side-frame outer portion 52 with the lower end portion of the reinforcement 54 being interposed between the joining flange portion 51b and the joining flange portion 52b.

As a result, the front side frame closed cross-section 50S is divided into the left and the right by the reinforcement 54 as illustrated in FIG. 5, and the reinforcement 54 is formed so as to linearly extend in the up-down direction between the upper and lower joining flange portions 51a, 52a, 51b, and 52b.

As described above, by providing the reinforcement 54 extending in the up-down direction in the closed cross-section 50S of the front side frame 50 to which the suspension tower portion 24 is connected, the sectional collapse of the front side frame 50 due to the load input from the suspension tower portion 24 in the up-down direction is suppressed by the reinforcement 54.

In particular, when a pulling force pulling an upper portion of the front side frame 50 to the upper side is applied from the suspension tower portion 24, the reinforcement 54 serves as a support and the sectional collapse of the front side frame 50 is suppressed. The reinforcement 54 is interposed between the upper flange portions and lower flange portions 51a, 52a, 51b, and 52b and linearly extends in the up-down direction. Therefore, by causing the reinforcement 54 to reliably serve as a support against the up-down direction displacement of the front side frame 50, the sectional collapse of the front side frame 50 is suppressed more and the deterioration of the NVH performance is suppressed.

As illustrated in FIG. 5A, the positions of the upper and lower joining flange portions 51a, 51b, 52a, and 52b of the front-side-frame inner portion 51 and the front-side-frame outer portion 52 and the reinforcement 54 in the vehicle width direction substantially match with the position of the recessed front-rear bead portion 55 (one of the recessed beads) on the front-side-frame inner portion 51 side.

With use of a plurality of openings 64 and 64 for arc welding formed in a recessed bottom portion, that is, a so-called bottom surface of the recessed front-rear bead portion 55 (one of the recessed beads) of the front-side-frame inner portion 51, an up-down-direction intermediate portion of the reinforcement 54 is joined to a bottom surface of the bottom surface (see FIG. 5A to FIG. 7).

As illustrated in FIG. 2 and FIG. 3, the reinforcement 54 is provided so as to overlap with connecting portions (see the connecting portions obtained by the rivets 25, 26, and 27) of the suspension tower portion 24 with respect to the front side frame 50, in particular, with respect to the front-side-frame outer portion 52 in the vehicle front-rear direction. As a result, the deformation of the front side frame 50 in the up-down direction caused by the vertical load applied to the front side frame 50 from the suspension tower portion 24 is suppressed by the reinforcement 54.

As illustrated in FIGS. 5A and 5B, the reinforcement 54 is three-piece-joined and fixed to the upper and lower joining flange portions 51a, 52a, 51b, and 52b of the front-side-frame inner portion 51 and the front-side-frame outer portion 52.

As already described above, in the reinforcement 54, the plurality of openings 54a that are long in the up-down direction are formed so as to be spaced apart from each other at a predetermined interval in the vehicle front-rear direction, and a step portion 54S (see FIGS. 5A and 5B, FIG. 6, and FIG. 8) is formed around the entire periphery of the rim portion of each of the openings 54a.

Specifically, as illustrated in FIG. 6, a separation distance L1 is formed between a vehicle-width-direction outer surface of the body of the reinforcement 54 in which the openings 54a are not formed and an outer surface of the section in which the openings 54a are formed, and the step portions 54S each corresponding to the separation distance L1 are formed.

In other words, beads (see the elements 54a and 54S) protruding to the vehicle-width-direction outer side are formed on a reinforcement body 54A of the reinforcement 54, vehicle-width-direction outer side surfaces of the beads are formed to be substantially flat, and the openings 54a are formed in those flat portions. The step portions 54S corresponding to the protrusion amount (see the separation distance L1) of each of the beads are formed.

As a result, fragile portions with respect to a frontal collision load are formed in the reinforcement 54 by the openings 54a that are long in the up-down direction, and the rigidity of the reinforcement 54 against the compression direction and the pulling direction is improved by the step portions 54S. Therefore, the sectional collapse of the front side frame 50 due to the load input from the suspension tower portion 24 in the up-down direction is further effectively suppressed.

As illustrated in FIG. 6 and FIG. 8, on both of front and rear end portions of the reinforcement 54, bending portions 54b and 54c extending from both of the end portions to the vehicle-width-direction outer side are integrally formed. Positioning openings 54d and 54e (in other words, reference holes for positioning) for the time of production are formed in the reinforcement 54 at front and rear places on the upper side thereof.

As illustrated in FIG. 8, the positioning opening 54e on the rear side out of the positioning openings 54d and 54e is formed to be adjacent to the oval shape opening 54a (see the opening 54a positioned on the rearmost side out of the plurality of openings Ma) in the up-down direction. In other words, the positioning opening 54e exists on a line extending from the opening 54a positioned on the rearmost portion.

As a result, the positioning opening 54e serves as both of a positioning portion for when the reinforcement 54 is assembled onto the front side frame 50 and a fragile portion for when the front side frame 50 and the reinforcement 54 are compressively deformed at the time of a vehicle frontal collision.

As illustrated in FIG. 3, FIG. 4, and FIGS. 5A and 5B, a lower portion reinforcement member 65 extending from a position corresponding to a rear end portion of the reinforcement 54 to a rear end portion of the front side frame 50 in the front-rear direction is provided. As illustrated in FIG. 5A, the lower portion reinforcement member 65 is disposed on an inner bottom portion of the front-side-frame outer portion 52 so as to have a recessed shape in cross-section.

As illustrated in FIG. 3 and FIG. 6, a front-rear-direction intermediate portion of the subframe is mounted on a lower surface of the front side frame 50 in a position directly behind the reinforcement 54. In order to mount the front-rear-direction intermediate portion of the subframe, a weld nut 66 serving as a subframe intermediate mounting portion is provided in a position directly behind the reinforcement 54. As illustrated in FIG. 3, FIG. 4, and FIG. 6, an intermediate joint member 67 is provided in the front side frame closed cross-section 50S in a position directly in front of the weld nut 66 and in a position directly behind the reinforcement 54.

As illustrated in FIG. 6 and FIG. 9C, the intermediate joint member 67 is obtained by integrally forming a joint 67a extending in the vehicle width direction, a flange 67b extending from a vehicle-width-direction inner end of the joint 67a to the rear side, and a flange 67c extending from a vehicle-width-direction outer end of the joint 67a to the front side.

As illustrated in FIG. 6 and FIG. 7, the flange 67b of the intermediate joint member 67 is fixed to the recessed front-rear bead portion 55 on the front-side-frame inner portion 51 side with use of an opening 68 for arc welding formed in the front-side-frame inner portion 51. The flange 67c of the intermediate joint member 67 is joined and fixed to the recessed front-rear bead portion 55 on the front-side-frame outer portion 52 side by spot welding means. In other words, the intermediate joint member 67 is joined to the recessed front-rear bead portions 55 and 55 that are left and right recessed beads in the front side frame closed cross-section SOS at a position directly behind the reinforcement 54.

As a result, the deformation of the front side frame 50 in the up-down direction due to the vertical load applied to the front side frame 50 from the suspension tower portion 24 is suppressed even more effectively by both of the reinforcement 54 and the intermediate joint member 67.

As illustrated in FIG. 3 and FIG. 4, a rear portion joint member 69 is disposed in a place in the front side frame closed cross-section SOS corresponding to a front end of the gusset member 23. In the drawings, arrow F indicates the vehicle front side, arrow R indicates the vehicle rear side, arrow IN indicates the vehicle-width-direction inner side, arrow OUT indicates the vehicle-width-direction outer side, and arrow UP indicates the vehicle upper side.

As described above, the front vehicle-body structure of the vehicle of Embodiment 1 illustrated in FIG. 1 to FIG. 9C is the front vehicle-body structure of the vehicle including the pair of left and right front side frames 50 extending in the vehicle front-rear direction. In the front vehicle-body structure, each of the front side frames 50 includes the outer member (see the front-side-frame outer portion 52) and the inner member (see the front-side-frame inner portion 51), the outer member and the inner member each have the vertical wall surface portion (see the outer wall surface portion 52*c* and the inner wall surface portion 51*c*) in which the recessed bead (recessed front-rear bead portion 55) extending from the front side to at least a position next to the suspension tower portion 24 in the vehicle front-rear direction is formed, the reinforcement 54 disposed so as to extend in the vehicle front-rear direction and extend in the up-down direction so as to divide the closed cross-section 50S of the front side frame 50 into left and right is included between the inner member and the outer member of the front side frame 50 to which the suspension tower portion 24 is connected, and the reinforcement 54 is formed to be joined to the upper flange portions and the lower flange portions of the outer member and the inner member of the front side frame 50 with the reinforcement 54 being interposed between the upper flange portions and between the lower flange portions and to linearly extend in the up-down direction (see FIG. 1 and FIG. 3 to FIG. 6).

According to this configuration, the reinforcement 54 extending in the up-down direction is provided in the closed cross-section 50S of the front side frame 50 to which the suspension tower portion 24 is connected, and hence the sectional collapse of the front side frame 50 due to the load input from the suspension tower portion 24 in the up-down direction can be suppressed by the reinforcement 54 and the deterioration of the NVH performance can be suppressed.

In particular, when a pulling force pulling the upper portion of the front side frame 50 to the upper side is applied from the suspension tower portion 24, the reinforcement 54 can suppress the sectional collapse of the front side frame 50 and suppress the deterioration of the NVH performance by serving as a support.

The reinforcement 54 is formed to be joined to the upper flange portions and the lower flange portions 51*a*, 51*b*, 52*a*, and 52*b* of the outer member (front-side-frame outer portion 52) and the inner member (front-side-frame inner portion 51) of the front side frame 50 with the reinforcement 54 being interposed between the upper flange portions and the lower flange portions 51*a*, 51*b*, 52*a*, and 52*b* and to linearly extend in the up-down direction (see FIGS. 5A and 5B), and hence has the following effect.

The reinforcement 54 is interposed between the upper flange portions and lower flange portions 51*a*, 52*a*, 51*b*, and 52*b* and linearly extends in the up-down direction. Therefore, the sectional collapse of the front side frame 50 can be suppressed even more and the deterioration of the NVH performance can be suppressed by causing the reinforcement 54 to reliably serve as a support against the displacement of the front side frame 50 in the up-down direction.

In one embodiment of the present disclosure, the openings 54*a* that are long in the up-down direction are formed in the reinforcement 54 so as to be spaced apart from each other at a predetermined interval in the vehicle front-rear direction, and the openings 54*a* each have a rim portion on which the step portion MS is formed (see FIGS. 5A, 5B and 6).

According to this configuration, the fragile portion with respect to the load (frontal collision load) in the front-rear direction can be formed in the reinforcement 54 by the openings 54*a* that are long in the up-down direction, and the rigidity of the reinforcement 54 against the compression direction and the pulling direction can be improved by forming the step portion 54S. As a result, the sectional collapse of the front side frame 50 due to the load input from the suspension tower portion 24 in the up-down direction can be further effectively suppressed, and the deterioration of the NVH performance can be suppressed.

In one embodiment of the present disclosure, the subframe is mounted on the lower surface of the front side frame 50 at a position directly behind the reinforcement 54, the joint member (see the intermediate joint member 67) is provided in the front side frame closed cross-section 50S at the position, and the joint member (intermediate joint member 67) is joined to left and right ones of the recessed beads (see the recessed front-rear bead portions 55) (see FIG. 6 and FIGS. 9A to 9C).

According to this configuration, the deformation of the front side frame 50 in the up-down direction due the vertical load applied to the front side frame 50 from the suspension tower portion 24 can be suppressed even more effectively by both of the reinforcement 54 and the joint member (intermediate joint member 67).

According to this configuration, the deformation of the front side frame 50 in the up-down direction due to the vertical load applied to the front side frame 50 from the suspension tower portion 24 can be suppressed even more effectively by both of the reinforcement 54 and the joint member (intermediate joint member 67).

A protruding bead may be employed instead of the recessed front-rear bead portion 55 formed in the front side frame 50. The protruding bead is a portion of a hollow cross-shape portion protruding in the vehicle width direction in a front side frame of which cross-sectional shape in the vehicle width direction is a hollow cross shape.

Embodiment 2

Figure 10:
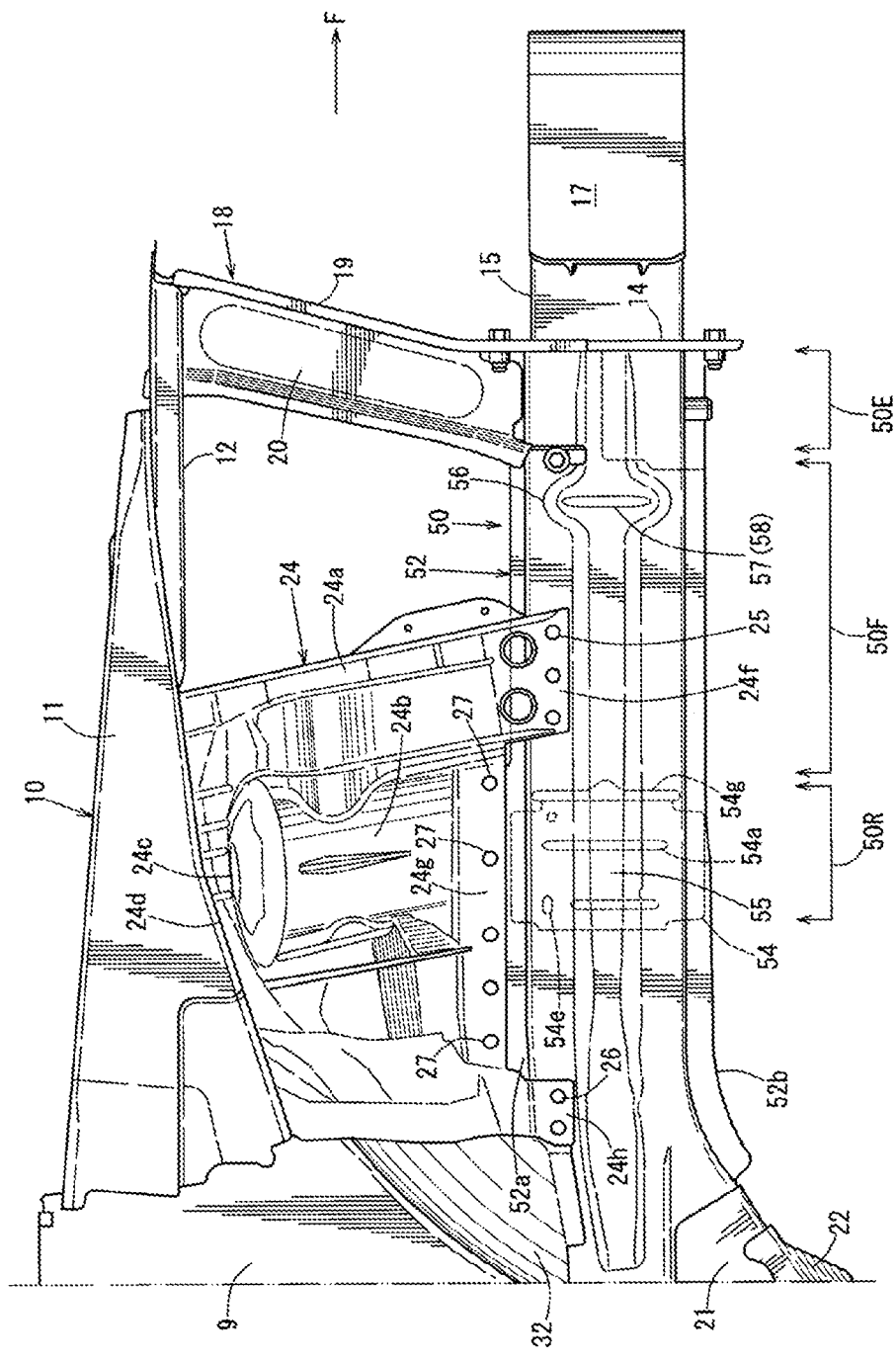
FIG. 10 is an outer side view illustrating another embodiment of a front vehicle-body structure on the vehicle right side.
Figure 11:
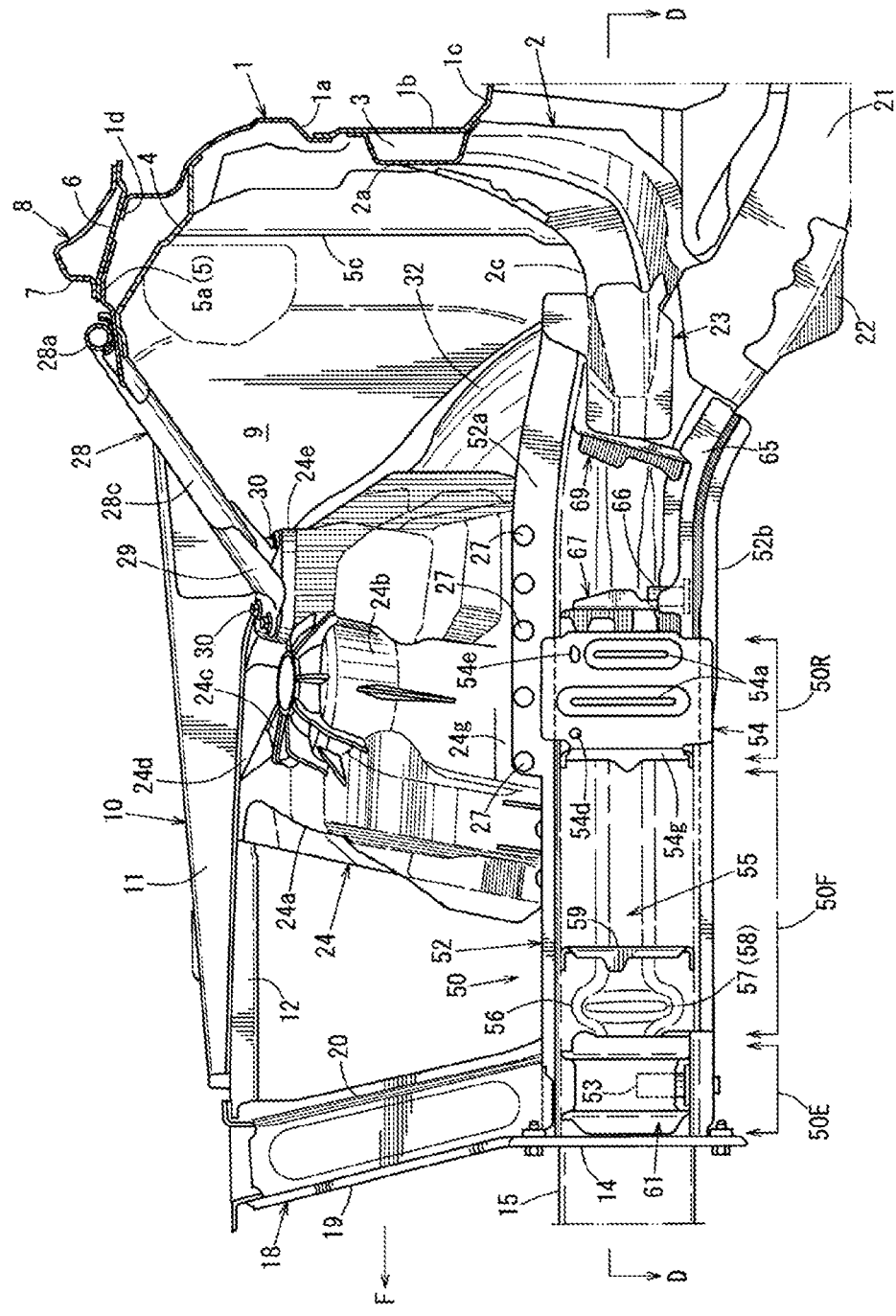
FIG. 11 is an inner side view illustrating the other embodiment of the front vehicle-body structure in a state in which a front-side-frame inner portion is removed.
Figure 12:
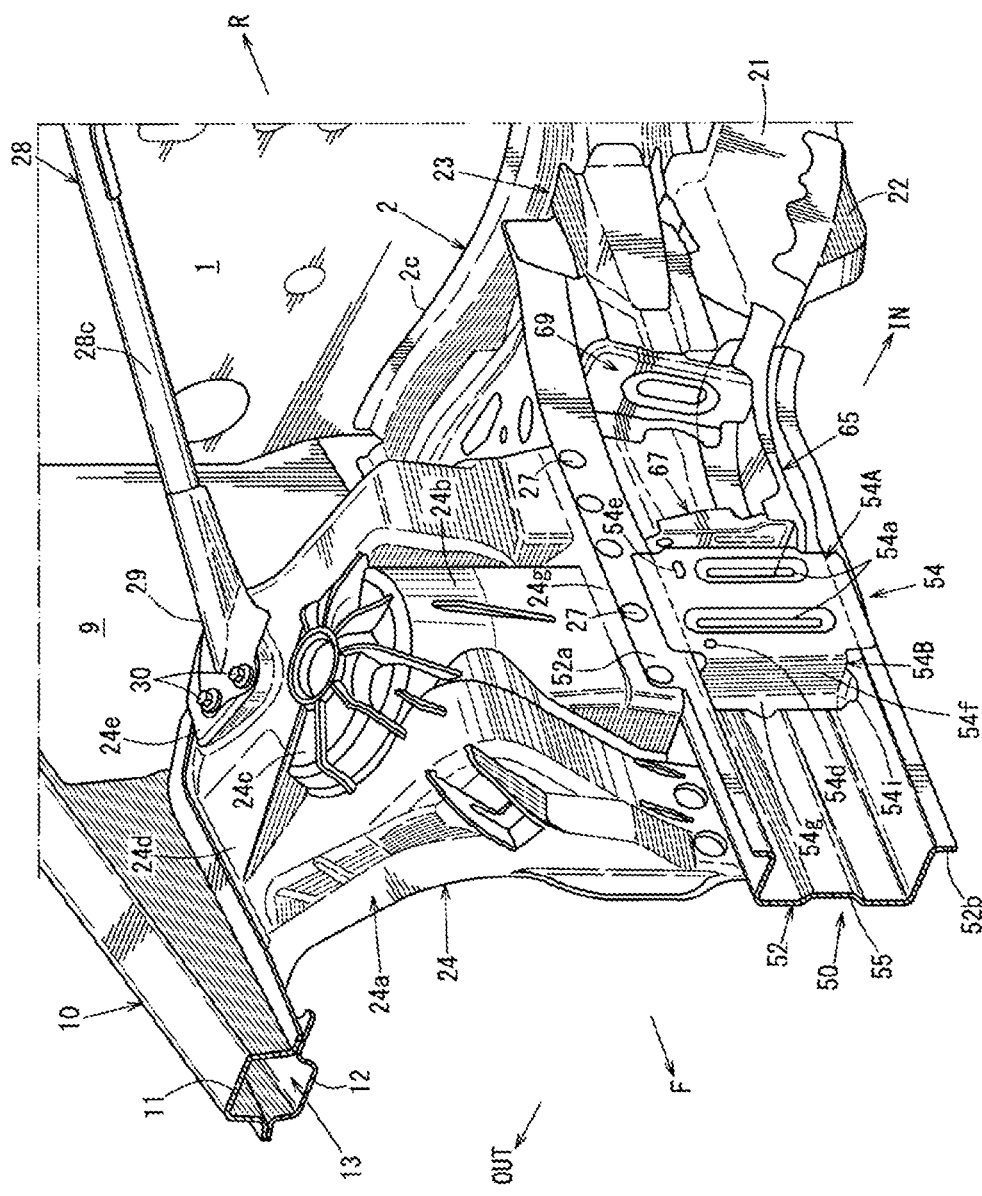
FIG. 12 is a main-part perspective view of FIG. 11.
Figure 13:
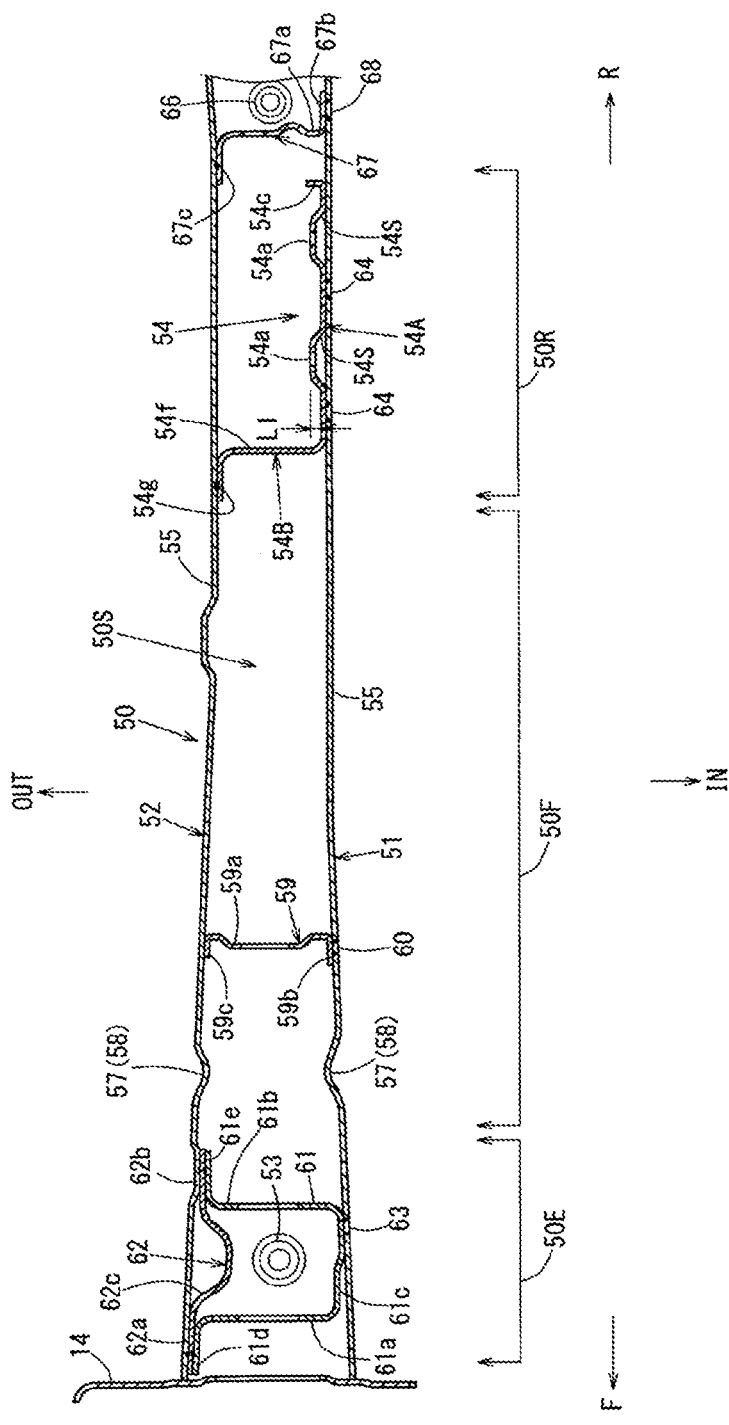
FIG. 13 is a main-part enlarged cross-sectional view taken along line D-D in FIG. 11.
Figure 14:
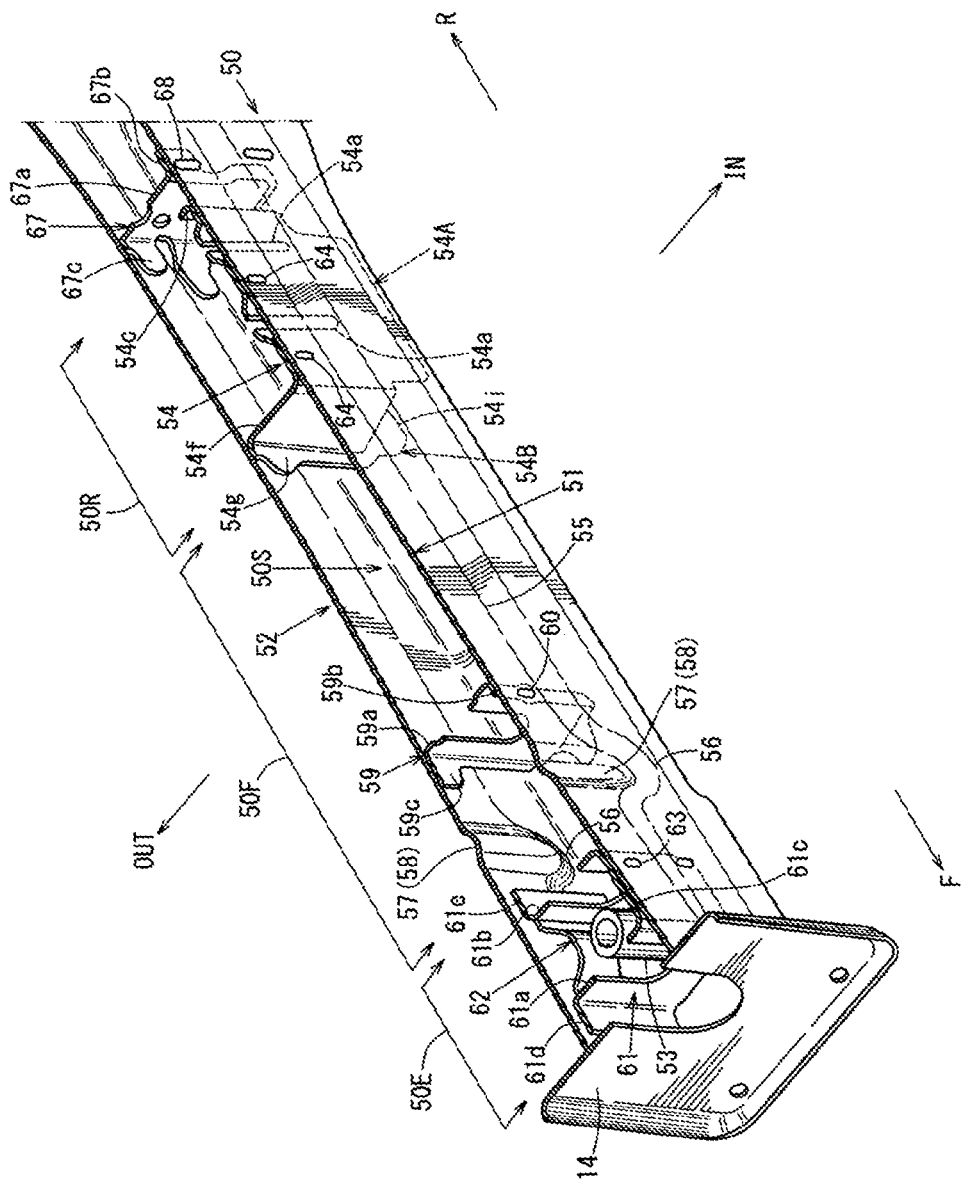
FIG. 14 is an upper perspective view of FIG. 13.
Figure 15:
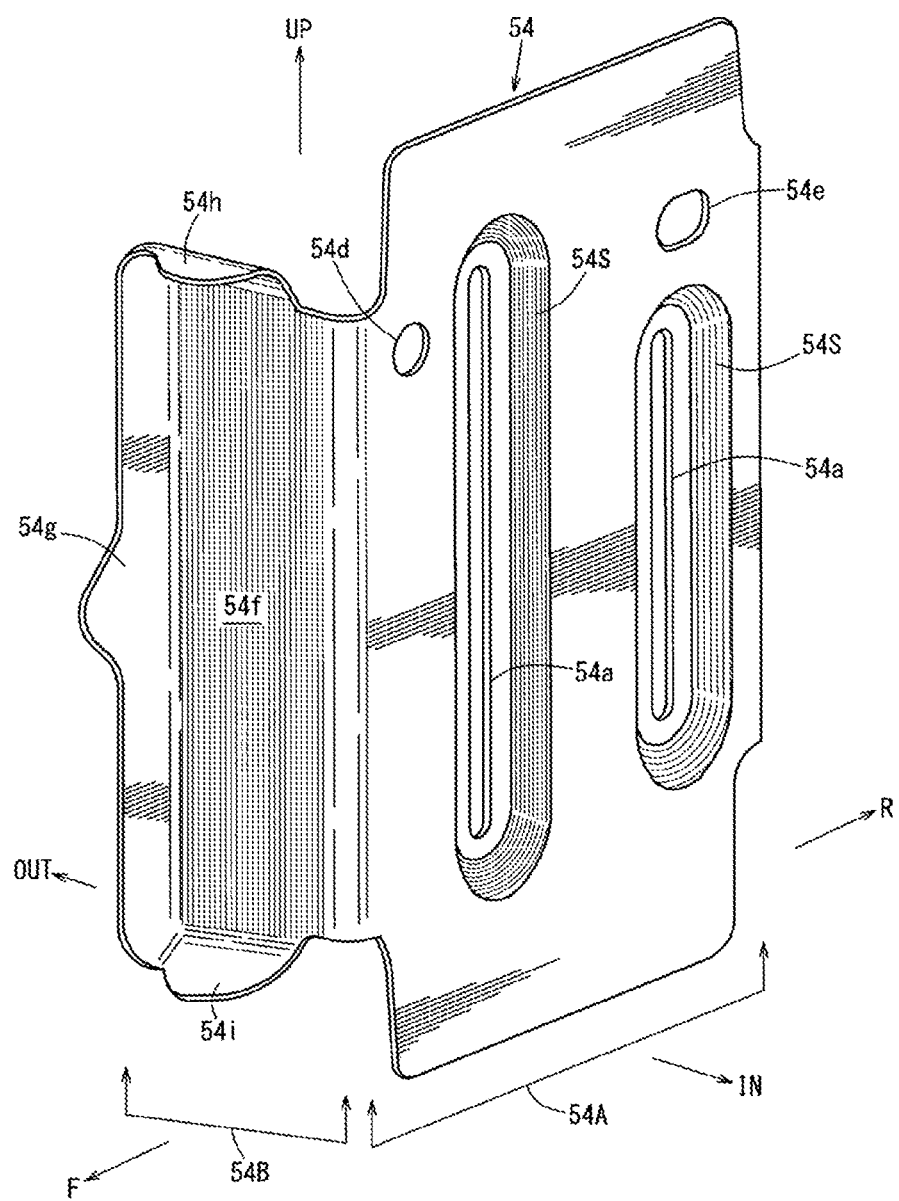
FIG. 15 is a perspective view illustrating the other embodiment of a reinforcement.

FIG. 10 to FIG. 15 illustrate Embodiment 2 of a front vehicle-body structure of a vehicle. FIG. 10 is an outer side view illustrating Embodiment 2 of the front vehicle-body structure on the vehicle right side, and FIG. 11 is an inner side view illustrating Embodiment 2 of the front vehicle-body structure in a state in which the front-side-frame inner portion 51 is removed. FIG. 12 is a main-part perspective view of FIG. 11, FIG. 13 is a main-part enlarged cross-sectional view taken along line D-D in FIG. 11, FIG. 14 is an upper perspective view of FIG. 13, and FIG. 15 is a perspective view illustrating the other embodiment of the reinforcement 54.

In FIG. 10 to FIG. 15, the same parts as those in the previous drawing are denoted by the same reference characters and detailed description thereof is omitted. FIG. 10 to FIG. 15 illustrate the structure on the vehicle right side, but the structure on the vehicle left side is formed to be bilaterally symmetrical or substantially bilaterally symmetrical to that on the right side.

In Embodiment 1 illustrated in FIG. 1 to FIG. 9C, the reinforcement 54 in which a total of five fragile portions (openings 54*a*) are formed so as to be spaced apart from each other at a predetermined interval in the vehicle front-rear direction has been exemplified, but the reinforcement 54 in which a total of two fragile portions (openings 54*a*) are formed so as to be spaced apart from each other at a predetermined interval is employed in Embodiment 2 illustrated in FIG. 10 to FIG. 15.

As a result, the length of the reinforcement 54 of Embodiment 2 in the vehicle front-rear direction is relatively shorter than the length of the reinforcement 54 of Embodiment 1 in the vehicle front-rear direction, and the weight of the reinforcement 54 can be saved by the length.

In the reinforcement 54 of Embodiment 2, the up-down-direction cross-sectional structure of a section in which the openings 54a are formed is the same as that of FIG. 5C, and the up-down-direction cross-sectional structure of a section in which the openings 54a are not formed is the same as that of FIG. 5A.

As illustrated in FIG. 15, the reinforcement 54 includes the reinforcement body 54A in which the plurality of openings 54a extending in the up-down direction and the plurality of positioning openings 54d and 54e are formed, and a folded portion 54B integrally formed by being bent from a front end of the reinforcement body 54A to the vehicle-width-direction outer side.

As illustrated in FIG. 15, the folded portion 54B includes a front wall portion 54f extending from the front end of the reinforcement body 54A to the vehicle-width-direction outer side, a side flange 54g extending from a vehicle-width-direction outer end of the front wall portion 54f to the front side, and an upper flange 54h and a lower flange 54i extending from an upper end and a lower end of the front wall portion 54f to the front side.

As illustrated in FIG. 12 and FIG. 13, the folded portion MB is folded toward the recessed front-rear bead portion 55 of the front-side-frame outer portion 52 that is the other of the recessed beads. The side flange 54g of the folded portion 54B is joined and fixed to the recessed bottom surface in the recessed front-rear bead portion 55 of the front-side-frame outer portion 52 by spot welding means. The upper and lower flanges 54h and 54i of the folded portion 54B are joined and fixed to upper and lower inner surfaces of the front-side-frame outer portion 52 by spot welding means.

The reinforcement body 54A of the reinforcement 54 is joined and fixed to the recessed bottom surface in the recessed front-rear bead portion 55 (one of the recessed beads) of the front-side-frame inner portion 51 with use of the plurality of openings 64 for arc welding illustrated in FIG. 14.

As described above, in the front vehicle-body structure of the vehicle of Embodiment 2 illustrated in FIG. 10 to FIG. 15, the recessed bead (recessed front-rear bead portion 55) is formed in each of the vertical wall surface portions (the outer wall surface portion 52c and the inner wall surface portion 51c) of the outer member (front-side-frame outer portion 52) and the inner member (front-side-frame inner portion 51) of the front side frame 50, the positions of the upper flange portions and lower flange portions (51a, 52a, 51b, and 52b) of the outer member and the inner member and the reinforcement 54 in the vehicle width direction substantially match with the position of one of the recessed beads (the recessed front-rear bead portion 55 on the front-side-frame inner portion 51 side), the reinforcement 54 is joined to the bottom surface of one of the recessed beads, the folded portion 54B folded toward another of the recessed beads (the recessed front-rear bead portion 55 on the front-side-frame outer portion 52) is formed in the reinforcement 54, and the folded portion 54B is joined to the another of the recessed beads (see FIGS. 5A and 5B, FIG. 13, and FIG. 15).

According to this configuration, the reinforcement 54 is joined to one of the recessed beads (the recessed front-rear bead portion 55 on the inner side) and the another of the recessed beads (the recessed front-rear bead portion 55 on the outer side), and hence the sectional collapse of the front side frame 50 can be prevented even more effectively and the deterioration of the NVH performance can be suppressed. Embodiment 2 illustrated in FIG. 10 to FIG. 15 also exhibits actions and effects substantially similar to those of Embodiment 1 illustrated in FIG. 1 to FIG. 9C regarding other features.

Regarding the correspondence between the configuration of the present disclosure and the abovementioned embodiments, the outer member of the front side frame of the present disclosure corresponds to the front-side-frame outer portion 52 of the embodiments. Similarly, the inner member of the front side frame corresponds to the front-side-frame inner portion 51, the vertical wall surface portions correspond to the outer wall surface portion 52c and the inner wall surface portion 51c, the recessed beads correspond to the recessed front-rear bead portions 55, the upper flange portions and lower flange portions correspond to the joining flange portions 51a, 51b, 52a, and 52b, the closed cross-section of the front side frame corresponds to the front side frame closed cross-section 50S, the joint member corresponds to the intermediate joint member 67, one of the recessed beads corresponds to the recessed bead portion 55 on the front-side-frame inner portion 51 side, and the other of the recessed beads corresponds to the recessed front-rear bead portion 55 on the front-side-frame outer portion 52 side. However, the present disclosure is not limited to the configuration of the abovementioned embodiments.

For example, the folded portion 54B of Embodiment 2 illustrated in FIG. 15 may be provided on the front end of the reinforcement 54 in FIG. 8 instead of the bending portion 54b of the reinforcement 54 of Embodiment 1 illustrated in FIG. 8.

As described above, the present disclosure is useful for a front vehicle-body structure of a vehicle including a pair of left and right front side frames extending in the vehicle front-rear direction.

What is claimed is:

1. A front vehicle-body structure of a vehicle, the front vehicle-body structure comprising:
a pair of left and right front side frames extending in a vehicle front-rear direction, each of the front side frames including an outer member and an inner member, and the outer member and the inner member each having a vertical wall surface portion in which a recessed bead or a protruding bead extending from a front side to at least a position next to a suspension tower portion in the vehicle front-rear direction is configured; and
a reinforcement disposed so as to extend in the vehicle front-rear direction and extend in an up-down direction so as to divide a closed cross-section of the front side frame into left and right, the reinforcement being included between the inner member and the outer member of the front side frame to which the suspension tower portion is connected, and the reinforcement being configured to join to upper flange portions and lower flange portions of the outer member and the inner member of the front side frame with the reinforcement being interposed between the upper flange portions and between the lower flange portions and to linearly extend in the up-down direction.

2. The front vehicle-body structure of the vehicle according to claim 1, wherein:
the recessed bead is configured in each of the vertical wall surface portions of the outer member and the inner member of the front side frame;
positions of the upper flange portions and the lower flange portions of the outer member and the inner member and the reinforcement in a vehicle width direction substantially match with a position of one of the recessed beads;
the reinforcement is joined to a bottom surface of the one of the recessed beads;

a folded portion folded toward another of the recessed beads is configured in the reinforcement; and the folded portion is joined to the another of the recessed beads.

3. The front vehicle-body structure of the vehicle according to claim 2, wherein:

openings long in the up-down direction are configured in the reinforcement so as to be spaced apart from each other at a predetermined interval in the vehicle front-rear direction; and the openings each have a rim portion on which a step portion is configured.

4. The front vehicle-body structure of the vehicle according to claim 3, wherein:

a subframe is mounted on a lower surface of the front side frame at a position directly behind the reinforcement;

a joint member is provided in a front side frame cross-section at the position; and the joint member is joined to left and right ones of the recessed beads.

5. The front vehicle-body structure of the vehicle according to claim 1, wherein:

openings long in the up-down direction are configured in the reinforcement so as to be spaced apart from each other at a predetermined interval in the vehicle front-rear direction; and the openings each have a rim portion on which a step portion is configured.

6. The front vehicle-body structure of the vehicle according to claim 1, wherein:

a subframe is mounted on a lower surface of the front side frame at a position directly behind the reinforcement;

a joint member is provided in a front side frame cross-section at the position; and the joint member is joined to left and right ones of the recessed beads.

7. The front vehicle-body structure of the vehicle according to claim 2, wherein:

a subframe is mounted on a lower surface of the front side frame at a position directly behind the reinforcement;

a joint member is provided in a front side frame cross-section at the position; and the joint member is joined to left and right ones of the recessed beads.

8. The front vehicle-body structure of the vehicle according to claim 5, wherein:

a subframe is mounted on a lower surface of the front side frame at a position directly behind the reinforcement;

a joint member is provided in a front side frame cross-section at the position; and the joint member is joined to left and right ones of the recessed beads.

* * * * *